(12) United States Patent
Lopez Ondevilla et al.

(10) Patent No.: US 12,158,398 B2
(45) Date of Patent: Dec. 3, 2024

(54) DEVICE FOR DETECTING BREAKAGES IN HIGH-PRESSURE PROCESSING BAGS

(71) Applicant: HIPERBARIC, S.A., Burgos (ES)

(72) Inventors: Raul Lopez Ondevilla, Burgos (ES); Ciro Ruiz Roman, Burgos (ES); Santiago Tarrago Mingo, Burgos (ES); Andres Felipe Hernando Saiz, Burgos (ES); Francisco Javier Hernando Saiz, Burgos (ES)

(73) Assignee: HIPERBARIC, S.A., Burgos (ES)

( * ) Notice: Subject to any disclaimer, the term of this patent is extended or adjusted under 35 U.S.C. 154(b) by 243 days.

(21) Appl. No.: 17/779,842

(22) PCT Filed: Nov. 26, 2019

(86) PCT No.: PCT/ES2019/070804
§ 371 (c)(1),
(2) Date: May 25, 2022

(87) PCT Pub. No.: WO2021/105525
PCT Pub. Date: Jun. 3, 2021

(65) Prior Publication Data
US 2023/0003607 A1  Jan. 5, 2023

(51) Int. Cl.
G01M 3/40 (2006.01)
G01M 3/02 (2006.01)
G01M 3/18 (2006.01)

(52) U.S. Cl.
CPC .............. *G01M 3/40* (2013.01); *G01M 3/027* (2013.01); *G01M 3/187* (2013.01)

(58) Field of Classification Search
None
See application file for complete search history.

(56) References Cited

U.S. PATENT DOCUMENTS

| | | | |
|---|---|---|---|
| 5,932,798 A * | 8/1999 | Rea ..................... | G01M 3/3281 73/49.8 |
| 6,354,142 B1 * | 3/2002 | Nothhelfer .......... | G01M 3/3281 73/49.3 |

(Continued)

FOREIGN PATENT DOCUMENTS

| | | | | |
|---|---|---|---|---|
| FR | 2810733 A1 | 12/2001 | | |
| GB | 1589751 A * | 5/1981 | ............. | B65D 25/02 |

(Continued)

OTHER PUBLICATIONS

International Search Report issued for PCT/ES2019/070804 mailed on Aug. 3, 2020.

(Continued)

*Primary Examiner* — Patrick Assouad
*Assistant Examiner* — Mark A Shabman
(74) *Attorney, Agent, or Firm* — Kutak Rock LLP

(57) ABSTRACT

Device for detecting breakages in high-pressure processing bags, wherein an elongated electrode (1) partially extends through the inside of one of the plugs (5a, 5b) of the device in its proximal part and, in its distal part, extends into the bag (6) of the product to be processed, the electrode being electrically insulated by an insulator (2) along its entire length, except in the part that is located inside the bag (6) and which is in contact with the product, wherein the proximal part of the electrode (1), which extends out of the plug, is connected to a power source and a device for measuring the electrical current, the resistance or the capacitance of a circuit, wherein said device is electrically connected by closing the circuit between the electrode and the pressurization water if the bag breaks.

19 Claims, 3 Drawing Sheets

(56) References Cited

U.S. PATENT DOCUMENTS

| | | | | |
|---|---|---|---|---|
| 8,910,509 | B2* | 12/2014 | Terentiev | G01M 3/227 |
| | | | | 73/49.3 |
| 9,097,609 | B1* | 8/2015 | Kelley | G01M 3/32 |
| 2009/0235722 | A1* | 9/2009 | Terentiev | G01M 3/187 |
| | | | | 73/40 |
| 2011/0308650 | A1* | 12/2011 | Amirouche | A61M 5/16804 |
| | | | | 137/565.13 |

FOREIGN PATENT DOCUMENTS

| | | |
|---|---|---|
| WO | 2019048716 A1 | 3/2019 |
| WO | 2021105525 A1 | 6/2021 |

OTHER PUBLICATIONS

Written Opinion issued for PCT/ES2019/070804; mailed on Aug. 3, 2020.

* cited by examiner

DEVICE FOR DETECTING BREAKAGES IN HIGH-PRESSURE PROCESSING BAGS

This is the United States National Stage of Patent Cooperation Treaty Application No. PCT/ES2019/070804, filed Nov. 26, 2019 the disclosure of which is incorporated herein by reference in its entirety.

SECTOR OF THE ART

The present invention belongs to the sector of high-pressure processing devices and methods for substances known as pumpable substances, in particular but not limited to fluids such as beverages, cosmetics, etc.

BACKGROUND OF THE INVENTION

High-Pressure Processing (HPP) is a technology that manages to reduce the microbial load without altering the characteristics of the processed product thanks to the application of pressures above 4,000 bar. The most popular HPP equipment operate by processing the product that is previously disposed in flexible packaging, e.g. bottles. The classic form of high-pressure processing is done in batches, i.e. by means of a discrete and non-continuous process. Initially, the products inside their flexible final packaging are loaded into containers (made of rigid plastic) that are introduced into a steel vessel, which is then filled with water. Once the vessel is filled, it closes completely and water is pumped at high pressure through one or more high-pressure intensifiers until reaching 4,000-6,000 bar. This pressure is maintained for a certain period time, which can vary from a few seconds to several minutes depending on the so-called recipe.

A new way of processing liquids using high pressure is based on applying pressure to the liquid inside a flexible bag or membrane situated inside the treatment vessel. The steps of filling and emptying the bag are carried out without opening the machine, that is, without moving wedges or plugs. An example of this technology can be found in application PCT/ES2017/070600. The product to be treated is introduced and removed through a single product plug. This plug has one inlet duct for the product and another for a cleaning agent. The product passes into the flexible bag or membrane, which is located inside the high-pressure chamber or vessel, through a metal to metal seat valve. The air present in the vessel is evacuated by the aeration plug, which has a similar valve, but situated at the top. Once the bag is filled, these valves are closed and water is pumped at high pressure through other ducts into the vessel. High-pressure water is introduced around the bag. The most common recipes are 6,000 bar for three or four minutes (depending on the product to be processed) and in the meantime, the product duct is cleaned.

During processing, the bag or membrane may break. In reference to FIG. 1, the sequence of operation of a bulk HPP equipment consists of the following steps:

1. Filling the bag 6 with the pumpable substance, through the duct 33' of the plug 5a.
2. Pressurising the vessel: water is pumped at high pressure through the ducts 20. The pressurised water remains inside the vessel 4 and outside the bag 6.
3. Maintaining the pressure inside the vessel 4 for a predetermined period of time (by the operator when selecting the recipe).
4. Depressurisation. Pressure is relieved by releasing water from inside the chamber to the exterior through discharge valves located in the ducts 20.
5. Emptying the bag. This step is carried out through the same filling valve on the plug 5a or another valve that could be enabled on any of the plugs.
6. The steps are repeated a certain number of times before the bag is changed.

The integrity of the bag can be affected by problems during the filling step of the bag because if the number of litres introduced is not well controlled, the bag can break due to the pumping pressure. Breakages can also occur during the step of depressurising the chamber. During this step, pressurised water (which can be at 6,000 bar) is instantly released from inside the chamber by opening the discharge valves. For the pressure to become equal to the atmospheric pressure, as much water as the amount that is introduced in the pumping step must come out. Since liquids tend to move from areas with higher pressure to areas with lower pressure and given that both the water and the pumpable substance have the same pressure, both fluids tend to come out when the valves are opened, such that the pumpable substance, in its attempt to move toward the exterior of the vessel, can drag the bag along the discharge path until it breaks. Another step where the bag may suffer suction damage is during the emptying step, as it can be dragged toward the outlet path of the valve. Currently, the leak detection system of the bag is based on the application of air pressure or any other gas to the exterior of the bag once it has been emptied (step 5) so that, if the bag breaks, the pressure is detected in the product outlet line. However, sometimes the holes are sealed due to creases in the bag or the pressure exerted against the vessel wall, due to which this detection system is not sufficiently reliable. In addition, since this method requires the bag to be fully emptied, if the breakage is detected, part of the emptying circuit needs to be cleaned, with the consequent loss of time since the product would have already been evacuated from the vessel. In the event that the bag is not broken, another drawback is that it takes a long time to fully empty the bag since the last litres are evacuated at a slower speed than the first, due to which the need to take out the entire product to verify the integrity of the bag lengthens the cycle time.

SUMMARY OF THE INVENTION

The object of the present invention is to provide a device for detecting breakages in bags of high-pressure processing devices that solves the drawbacks described above. To achieve, the invention has a device according to claim 1, equipped with means for measuring an electrical parameter (resistance, capacitance or intensity of the current, preferably) between the pressurization water around the bag and the product inside. Since the exterior of the bag is in contact with the treatment vessel and there is a small amount of water between the two, if there is a connection point between the interior and the exterior of the bag, the value of the electrical parameter measured between the pressurization water and the product will vary if there is a breakage. By monitoring this parameter, it is therefore possible to detect whether or not there is a breakage.

BRIEF DESCRIPTION OF THE FIGURES

In order to aid a better understanding of the features of the invention and to supplement this description, a set of illustrative and not limiting figures has been attached thereto as an integral part thereof.

DETAILED DESCRIPTION

Figure 1:
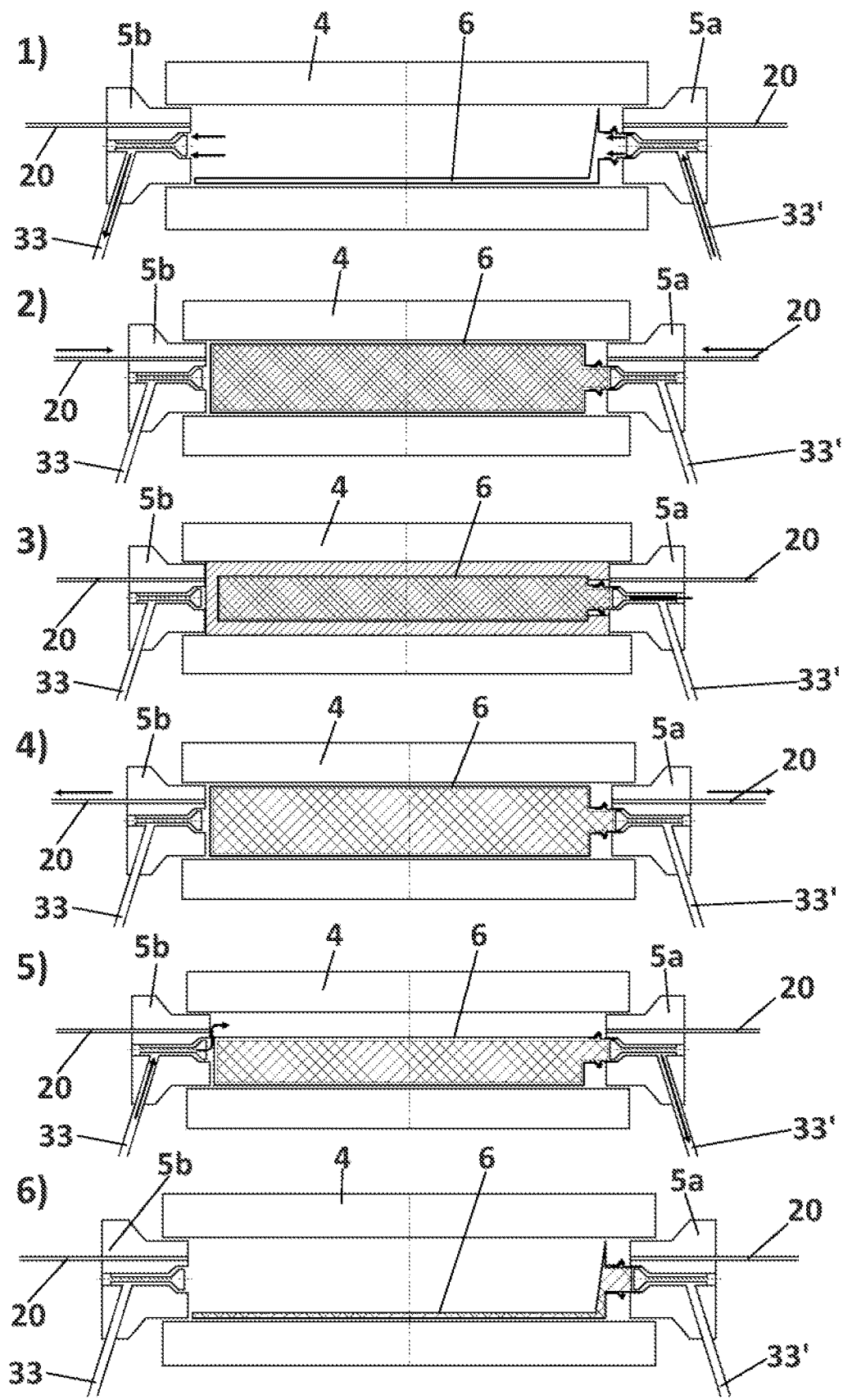
FIG. 1 shows the steps of HPP for pumpable substances in a piece of equipment according to the state of the art.
Figure 2:
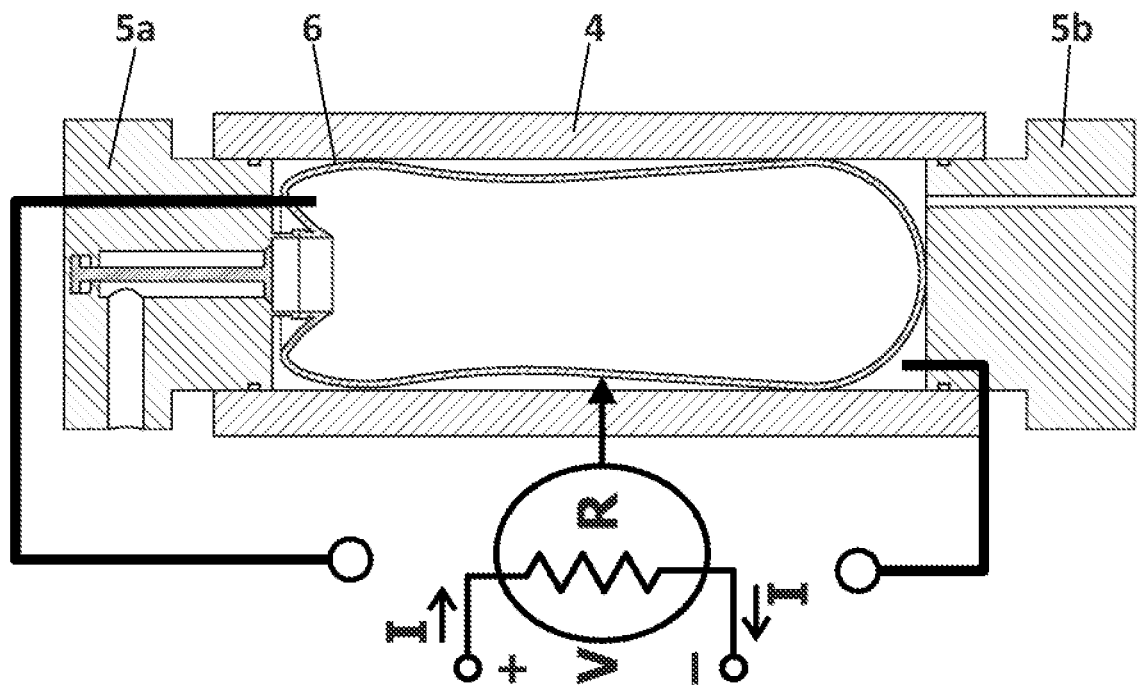
FIG. 2 shows an outline of the invention.
Figure 3:
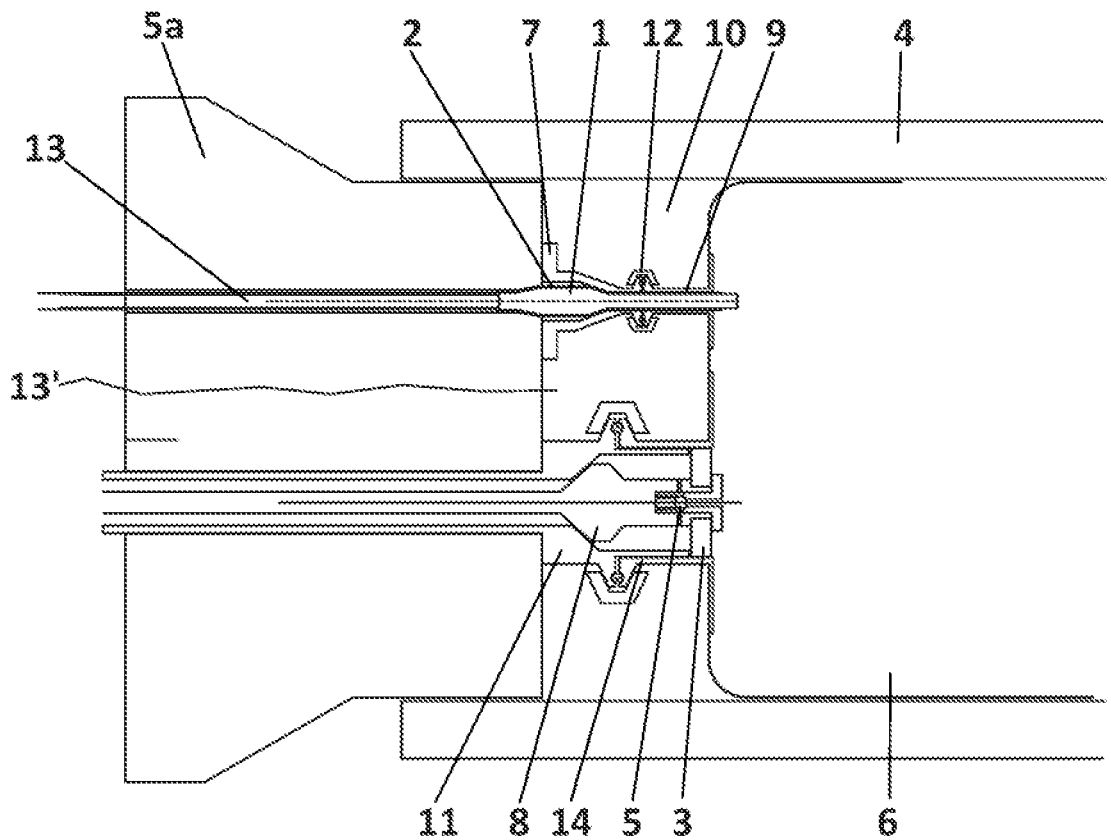
FIG. 3 shows details of the invention.

In reference to FIGS. 2 and 3, in a high-pressure processing machine equipped with a vessel and two plugs closing the same (5a and 5b), the invention comprises an elongated electrode 1 that partially extends through the inside of the plug 5a in its proximal part and further in the distal part, until it is introduced into the bag containing the product to be processed. In the embodiment shown in the drawings, the electrode extends through the filling plug 5a but could also be introduced into the vessel through the other plug. In the proximal part, extending inside the plug, an electrical cable 13 connects it to a power source, with said electrode acting as a cathode. In the section that runs through the plug and its exterior, to the area of the bag, the electrode is electrically insulated thanks to an insulator 2 (continuous coating or set of plastic parts). This way, the electrode is insulated from both the plug and the pressurization water 10. In the middle, the electrode may have a thickening to ensure mechanical contact with the plug. To hold the electrode in position and ensure said mechanical contact, a cap 7 is placed on the electrode, which pushes it, causing the male cone shape of the electrode to make a seal against the female cone shape of the plug. The bag 6 containing the product to be processed has, preferably but not necessarily, a connector 9 to the bag through which the electrode is introduced (FIG. 3). Alternatively, the electrode can be introduced by the same pre-existing connector 14 from the bag to the filling plug (FIG. 4) thanks to an auxiliary connector 9' that is attached to the connector 14 of the bag, preferably but not necessarily by means of a central coupling 15 that facilitates the assembly thereof. The final section of the electrode, which is inside the bag, does not have insulating material because it is in contact with the product to be processed.

In the first embodiment, in the case wherein the connector 9 of the electrode is separate from the connector 14 of the bag, the connector 9 and cap 7 assembly is optionally provided with a flange 12. The flange 12 holds everything together to ensure the sealing of the assembly during all steps of the process, preventing the communication between the pressurization water 10 and the product to be processed inside the bag, which would lead to the contamination of the product.

Figure 4:
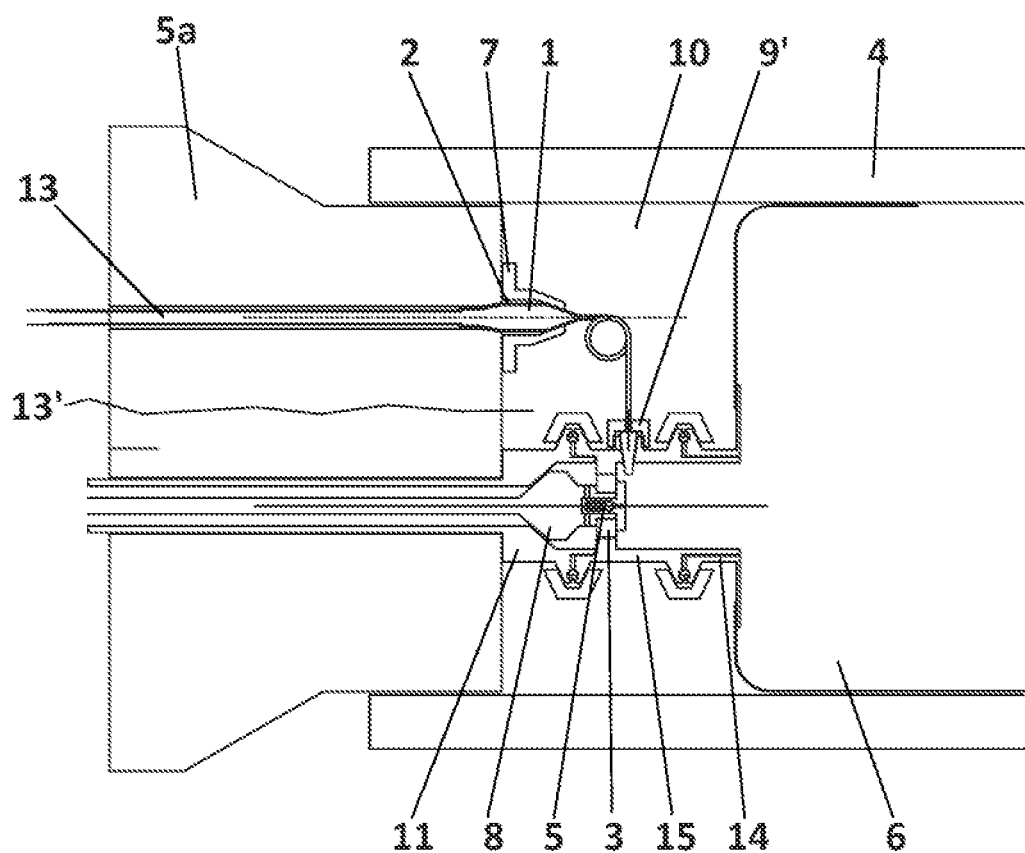
FIG. 4 shows another variant of the invention in which a connector to the pre-existing bag is used to introduce the electrode inside the bag.

In the second embodiment shown in FIG. 4, the connector 14 of the bag 6 to the product plug 5a has an auxiliary connector 9', which is preferably but not necessarily in the central coupling 15, for introducing the distal part of the electrode, which is not coated as provided above.

The bag 6, the connectors 9, 9', 14 and the central coupling 15 must be made of an electrically insulating material.

The power source to which the cable 13 and the electrode 1 are connected (optionally only the electrode if it was made long enough) is between 6 and 60V, preferably about 24 V of direct current. With less voltage, the system is less precise, but with more voltage, electrolysis phenomena can occur in the product to be processed when a difference of potential is applied to the electrode. The section of the electrode should be larger than 1 $mm^2$. The larger the cross section of the electrode, the more precise the system.

The anode is a second electrode 13' which is in electrical contact with the pressurization water. In the most common case, the high-pressure machine is made of metal, due to which it is enough to simply connect an electrode to the outer part of the treatment vessel or even to the plug 5a, which are in contact with the pressurization water.

In the event that the high-pressure processing machine is of the type described in application PCT/ES2017/070600, the equipment has a single product filling and emptying duct and a single valve whose male and female seats are made of metal. Therefore, in the male seat 8 of said valve, a plastic membrane 3 is provided in the distal area, which is the closest to the bag 6; the membrane is connected through a rod that is made of an insulating material to ensure there is no electrical contact. However, the female connector of the bag 14 is made of plastic, due to which it is an electrical insulator. Therefore, when the male seat 8 closes, the movement thereof moves the membrane 3 because it is integral to the same, and it becomes electrically insulated from the bag 6 of the male valve 8 and therefore from the pressurization water 10. Since the volume of the pumpable substance between the membrane 3 and the filling/emptying valve 8 decreases during pressurisation, it is necessary to have a system that allows the pumpable substance to pass from the inside of the bag 6 to equalise the pressures on either side of the membrane 3 and prevent the parts 11 or 14, and even the membrane 3 itself, from collapsing. This function is performed by a check valve 5, which can be a plastic ball with a spring return or a membrane. The check valve 5 must always be made of an electrically insulating material. The membrane, in combination with the check valve, prevents the generation of a current through the filling valve and keeps the electrical circuit open. Just as the electrode needs to be insulated, the filling valve must also be insulated by the membrane and the check valve.

The electrical parameter can be monitored throughout the entire pressurisation cycle, although it will most usually be monitored once the pressure cycle has been completed and the product from the pressurisation process has been brought to atmospheric pressure before the bag is emptied. For this purpose, a voltage is applied to the electrode 1. In the event that the bag were to be broken and since both the vessel and the plug are made of metal (electrical conductor), an electric current would pass through the circuit, from the interior of the bag to the exterior thereof and through the pressurization water to the vessel/plugs until the circuit is closed, producing a current whose intensity can be measured. If the bag maintains its integrity, the electrical circuit remains open as it is made from insulating material, so even if a voltage is applied to the electrode of the plug, since the circuit is not closed, a current will not move through the same. In the same way, the capacitance or resistance of said circuit can be measured instead of its intensity.

The device of the invention is able to detect small defects in the integrity of the treatment bag while it is full, which makes it possible to avoid contamination of the tank and the product line being processed in the event of a positive detection. The method is fast and does not penalise cycle times, as is the case in the state of the art. It also prevents false positives or negatives. Finally, it is compatible with existing systems, supports high-pressure limitations and is easy to handle and install by the production operator while changing the bag.

Based on this description and figures, the expert in the art may understand that the invention has been described according to some preferred embodiments thereof, but that multiple variations can be introduced in such preferred embodiments without exceeding the object of the invention as claimed.

The invention claimed is:

1. A high-pressure processing machine, the processing machine having a treatment vessel, a processing bag, at least one plug (5a,5b) for closing the treatment vessel and a device for detecting breakages in the processing bag, characterised in that the device is equipped with an elongated electrode (1) adapted to partially extend through the inside of the at least one plug (5a, 5b) into the bag (6) containing the product to be processed, the electrode being electrically insulated by an insulator (2) along its entire length, except ion the part inside the bag (6) and in contact with the product, wherein the part of the electrode (1) extending out of the plug is connected to a power source and a device for measuring the electrical current, the resistance or the capacitance of a circuit, wherein said device is electrically connected by closing the circuit between the electrode and the a pressurization water.

2. The machine according to claim 1, wherein one of the plugs is a filling plug, and the electrode (1) extends through the filling plug (5a).

3. The machine according to claims claim 1 or 2, wherein the electrode (1) has a thickening and a cap (7) that facilitate sealing the electrode against—the plug through which it extends.

4. The machine according to claim 3, wherein the electrode (1) extends into the bag (6) through a connector (9).

5. The machine according to claim 4, wherein the cap (7) and connector (9) are joined by a flange (12).

6. The machine according to claim 3, wherein one of the plugs is a filling plug, and the electrode (1) extends into the bag (6) through a bag connector (14) of said bag (6) connected to the filling plug (5a).

7. The machine according to claim 6, wherein the electrode (1) extends into the bag (6) through the bag connector (14) by means of an auxiliary connector (9') situated on the bag connector itself (14) or on a central coupling (15).

8. The machine according to claim 7, the valve being equipped with a male seat (8) and a plastic membrane (3) on the male seat (8).

9. The machine according to claim 6, the valve being equipped with a male seat (8) and a plastic membrane (3) on the male seat (8).

10. The machine according to claim 2, wherein one of the plugs is a filling plug, and the electrode (1) extends into the bag (6) through a bag connector (14) of said bag (6) connected to the filling plug (5a).

11. The machine according to claim 10, wherein the electrode (1) extends into the bag (6) through the bag connector (14) by means of an auxiliary connector (9') situated on the bag connector itself (14) or on a central coupling (15).

12. The machine according to claim 11, the valve being equipped with a male seat (8) and a plastic membrane (3) on the male seat (8).

13. The machine according to claim 10, the valve being equipped with a male seat (8) and a plastic membrane (3) on the male seat (8).

14. The machine according to any one of the claim 1, wherein one of the plugs is a filling plug, and the electrode (1) extends into the bag (6) through a bag connector (14) of said bag (6) connected to the filling plug (5a).

15. The machine according to claim 14, wherein the electrode (1) extends into the bag (6) through the bag connector (14) by means of an auxiliary connector (9') situated on the bag connector itself (14) or on a central coupling (15).

16. The machine according to claim 15, the valve being equipped with a male seat (8) and a plastic membrane (3) on the male seat (8).

17. The machine according to claim 14, the valve being equipped with a male seat (8) and a plastic membrane (3) on the male seat (8).

18. The machine according to claim 14, the valve being equipped with a male seat (8) and a plastic membrane (3) on the male seat (8).

19. The machine according to claim 1 having a single plug which is a filing and emptying plug.

* * * * *